Figure 1:
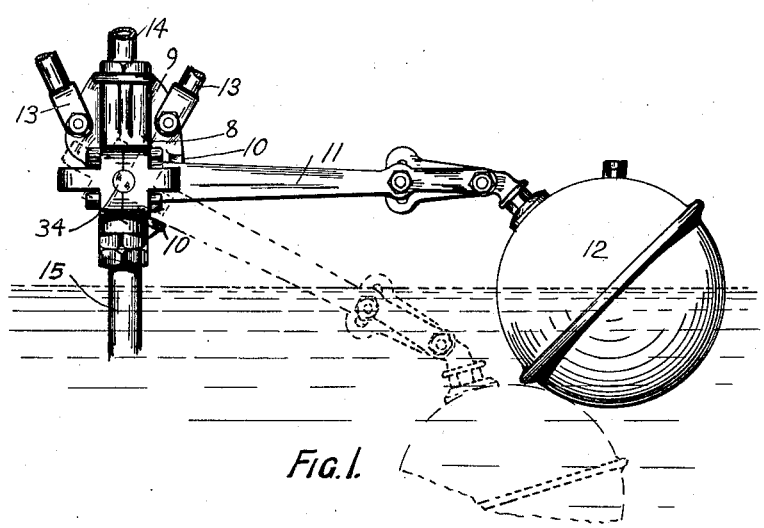

J. N. ELLIS.
FEED WATER REGULATING VALVE FOR STEAM BOILERS.
APPLICATION FILED AUG. 9, 1918.

1,313,373.

Patented Aug. 19, 1919.

2 SHEETS—SHEET 1.

Inventor:-
Julius Nelson Ellis,
By:- B. Singer, Atty.

J. N. ELLIS.
FEED WATER REGULATING VALVE FOR STEAM BOILERS.
APPLICATION FILED AUG. 9, 1918.

1,313,373.

Patented Aug. 19, 1919.
2 SHEETS—SHEET 2.

UNITED STATES PATENT OFFICE.

JULIUS NELSON ELLIS, OF PETERSHAM, NEW SOUTH WALES, AUSTRALIA.

FEED-WATER-REGULATING VALVE FOR STEAM-BOILERS.

1,313,373.      Specification of Letters Patent.      Patented Aug. 19, 1919.

Application filed August 9, 1918. Serial No. 249,133.

*To all whom it may concern:*

Be it known that I, JULIUS NELSON ELLIS, a subject of the King of Great Britain and Ireland, residing at "Glen-Ayr," Gould avenue, Petersham, in the State of New South Wales, Commonwealth of Australia, have invented certain new and useful Improvements in Feed-Water-Regulating Valves for Steam-Boilers, of which the following is a specification.

This invention relates to the regulation or control of the quantity of feed-water supplied to a boiler, by means of a float-controlled valve positioned within the boiler, and operating to control directly the incoming water or to regulate the supply of steam to a feed-pump or functionally equivalent apparatus.

It is a generally accepted maxim in boiler practice that the water level should be maintained practically at one definite level, but I have found by my investigations on the subject that a properly controlled variation of from four to six inches (more or less according to the size and evaporative efficiency of the boiler) in the water level is in all circumstances advantageous from the standpoint of economy of fuel, inasmuch as with a low water level a greater ratio of evaporation per unit of grate area and heating surface is obtained, while a high water level provides a greater thermal reservoir to meet a sudden demand for steam. Hence I conclude that the regulation of the feed water should be gradually effected before complete closure or maximum opening of the valve is reached, in order to give a wide range between maximum and minimum water level; and that the degree of valve opening required is much less than is usually considered necessary.

The object of my invention is to provide a float-controlled valve adapted to be fitted within the boiler and regulate the supply of steam to a feed pump or injector or directly regulate the quantity of feed water admitted to the boiler, said valve being so constructed that the opening thereof is effected gradually and the maximum required opening is reached only when a fall in the water level sufficient to cause the float arm to fall through an arc of about 22½ degrees has occurred, and these effects are produced with a minimum length of float-arm or lever compatible with the range required.

With these objects my invention consists of a valve of screw-down miter type, characterized in that the thread on the valve spindle is of a lead approximately equal to the diameter of the valve aperture, in combination with a float arm attached at one end to the valve spindle and a float on the other end of said arm, all adapted for installation within a boiler and so constructed and arranged that the valve spindle is rotated to close or open the valve by the rise or fall of the float, and the fall of the float arm through an arc of 22½ degrees effects sufficient movement of the valve spindle to provide an opening approximating in area to one fourth of that of the valve aperture.

My invention also consists in such other novel features as are hereinafter described.

The accompanying drawings illustrate valve construction according to this invention, and in them Figure 1 shows the valve and float as installed within a boiler and controlling the admission of feed water thereto, the float being supported in its highest position on the water therein, and the lowest position of said float being indicated by dotted lines.

Figure 2:
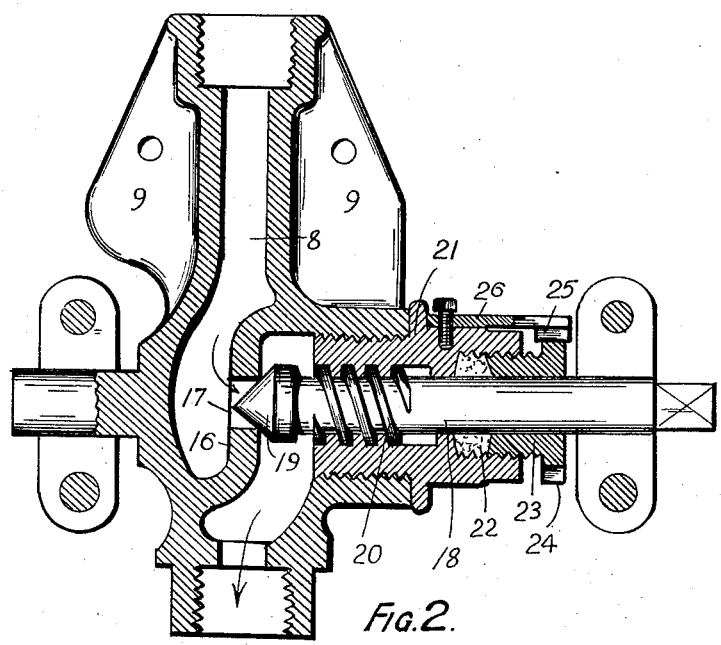

Fig. 2 is a sectional elevation of the valve on the plane of the spindle and

Figure 3:
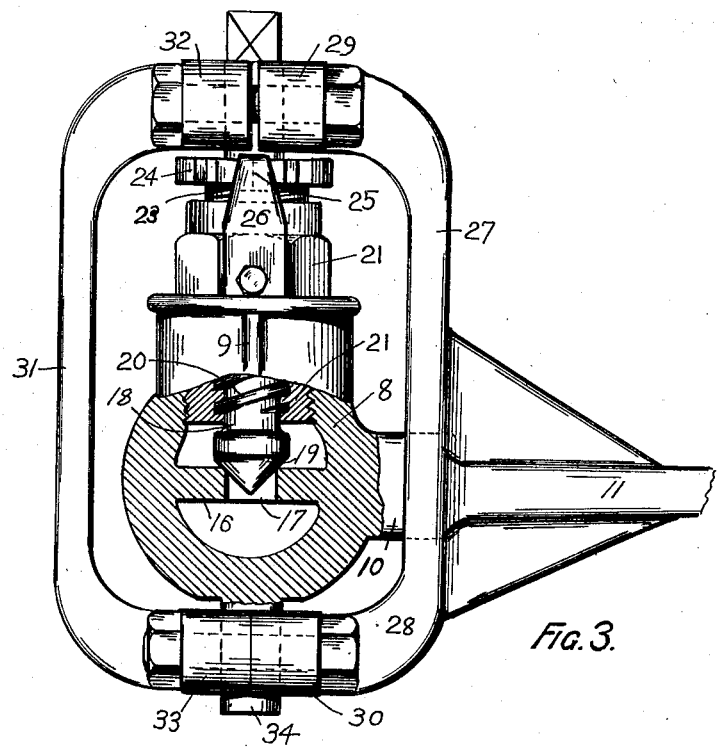

Fig. 3 a plan view partly in section on the plane of the spindle.

Figure 4:
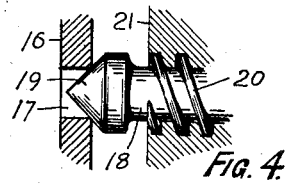
Figure 5:
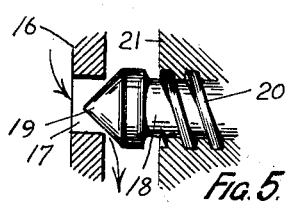
Figure 6:
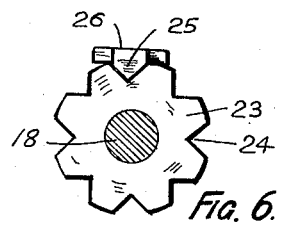

Figs. 4 and 5 are details showing in sectional elevation the relative position of the valve when in the closed and fully open positions respectively, while Fig. 6 is an elevation of the outer end of the gland showing locking means thereon.

In the drawings, 8 is the valve casing provided with wing lugs 9, 9, and with stops 10, 10, to limit to 30° the vertical movement of the float arm 11 adjustably articulated in known manner and carrying the float 12. The provision of a 30 degree limit of the float-arm movement allows a margin of 7½° beyond the required 22½°, which margin is provided to afford increased opening of the valve should such be necessary or desirable under any particular circumstances. The casing 8 is retained in the required position by suspensory stays 13.13 pivotally attached to the wing lugs 10, 10.

Feed water is conveyed to the valve by a pipe 14 and discharges therefrom through a tail-pipe 15 extending below the minimum working water level.

The casing 8 has a diaphragm 16 in which is an aperture 17, and in alinement with said aperture is a spindle 18 carrying on its end a miter valve 19, said spindle carrying a screw thread 20 (preferably double and square) of a lead equal or approximately equal to the diameter of the aperture 17. The threaded portion of said spindle engages a corresponding thread in a nut 21 screwed into the casing 8 and recessed to provide a packing box 22 into which screws a gland 23 having about its flange notches 24 one of which when the gland is adjusted is engaged by a detent pawl 25 carried on an arm 26 secured to and projecting from the nut 21 and whereby the gland is prevented from slacking back. By the provision of the nut 21 assembling and disassembling of the parts is provided for, as will be noted.

The packing box and gland being subjected to equal pressure within and without the valve; the packing need not be tightly compressed; but the said packing box and gland are desirable in order to insure that incoming water is discharged through the pipe 15 below water level and does not escape from the valve into the steam space and cause detonations in the boiler.

As shown clearly in Fig. 3 the float arm at the end remote from the float is formed into a pair of curved arms 27 and 28 having palms 29 and 30 respectively. A complementary member 31 has corresponding palms 32 and 33 which are respectively bolted to the before mentioned palms 29 and 30, the construction constituting a yoke surrounding the valve casing 8. The pair of palms 29—32 clamp between them the projecting part of the valve spindle 18 while the other pair freely engage a pivot pin or stud 34 projecting from the casing in axial alinement with the spindle 18. With this construction the float-arm has what amounts to a long pivot-bearing, and twisting of the arm on its bearing is prevented, so that the float moves in the same vertical plane at all times. The clamping attachment of the float arm to the valve spindle permits ready adjustment of those parts as may be required when installing the device or after regrinding of the valve and consequent shortening of the effective length of the spindle.

By the provision of the spindle 18 with threads of a lead equal to the diameter of the aperture 17, only a slight turning movement of the spindle is required to provide a sufficient flow, and in practice a downward movement of the float to the extent of 22½ degrees is sufficient to retract the valve 19 from its seat a distance equaling one sixteenth of the effective diameter of the valve aperture 17, and provide an annular opening equal in sectional area to approximately one fourth of that of said aperture, which opening I have found to be ample for supplying the necessary feed water to a boiler or for supplying steam to an injector or pump.

Where the valve is employed to control the supply of steam to an injector or pump, the tail pipe 15 is omitted and the steam enters the valve through the lower end of the body and is conveyed to said pump or injector by means of pipe 14.

In order to provide for a proper fluctuation of water level it is obvious that the valve as a whole must be proportioned (in regard to its effective sectional area) according to the duty it is required to perform. And it will be noted that the combination of the float-arm and screwed spindle constitutes a form of compound lever of extreme sensitiveness.

What I claim and desire to secure by Letters Patent is:—

1. A boiler-feed regulating valve of screwdown miter type characterized in that the screw thread on the valve spindle is of a lead equal to the diameter of the valve aperture, and having a pivot stud projecting from the valve body on the opposite side to and in axial alinement with the valve spindle; in combination with a float-arm formed at one end into a yoke, one side of which rigidly engages the valve spindle and the other side freely engages said pivot stud, and a float on the other end of said arm.

2. A boiler-feed regulating valve of screwdown miter type, comprising a body having fluid passages therein, wing-lugs on said body, suspensory stays engaging said lugs, an apertured diaphragm separating said passages, a spindle carrying a valve registering with said aperture, a screw thread on said spindle of a lead equal to the diameter of said aperture, a nut screwing into said body and engaging the screwed spindle, a packing box formed in said nut, a gland engaging said packing box and provided with an annular flange having peripheral notches, a detent pawl engaging any one of said notches, a rigid arm carrying said pawl and attached to said nut, and a pivot stud projecting from the valve body on the opposite side to and in axial alinement with the valve spindle; in combination with a float arm formed at one end into a pair of oppositely disposed and curved yoke members terminally formed into palms, a complementary yoke member also terminally formed into palms which register with and are bolted to the palms on the float-arm yoke members, one pair of said palms tightly clamping between them the valve spindle and the other pair freely engaging between them the pivot stud projecting from the valve body, and a float on the free end of said float-arm the downward movement of which is limited by a stop integral with the valve body.

Signed at Sydney, N. S. W., this second day of July, 1918.

JULIUS NELSON ELLIS.

Copies of this patent may be obtained for five cents each, by addressing the "Commissioner of Patents, Washington, D. C."